United States Patent [19]

Yamamori et al.

[11] 4,202,431
[45] May 13, 1980

[54] PASSAGE STRUCTURE OF LOCK-UP TORQUE CONVERTER

[75] Inventors: Takahiro Yamamori, Tokyo; Kunio Ohtsuka, Yokohama, both of Japan

[73] Assignee: Nissan Motor Company, Limited, Yokohama, Japan

[21] Appl. No.: 20,400

[22] Filed: Mar. 14, 1979

[30] Foreign Application Priority Data

Apr. 4, 1978 [JP] Japan .................. 53-38852

[51] Int. Cl.² ............................. F16D 33/00
[52] U.S. Cl. ...................... 192/3.29; 192/3.3; 60/361; 60/364
[58] Field of Search ............ 192/3.28, 3.29, 3.3, 192/3.31; 60/341, 361, 362, 364

[56] References Cited

U.S. PATENT DOCUMENTS

| | | | |
|---|---|---|---|
| 2,793,726 | 5/1957 | Jandasek | 192/3.29 |
| 3,189,144 | 6/1965 | Gabriel | 192/3.2 |
| 3,491,617 | 1/1970 | Konrad | 192/3.29 X |
| 3,497,043 | 2/1970 | Leonard | 192/0.052 |

FOREIGN PATENT DOCUMENTS 686911 2/1953 United Kingdom .
1181535 2/1970 United Kingdom .
1414641 11/1975 United Kingdom .

*Primary Examiner*—Edgar W. Geoghegan
*Attorney, Agent, or Firm*—Schwartz, Jeffery, Schwaab, Mack, Blumenthal & Koch

[57] ABSTRACT

Simple passage structure of a lock-up torque converter is disclosed. With this passage structure an output shaft without any circumferential groove can be used. The output shaft has an axial passage and a radial passage communicating with the axial passage. A first spacer is mounted within an annular space between the output shaft and a stationary sleeve to divide the annular space into a first annular chamber and into a second annular chamber. The first annular chamber communicates with the inside of a turbine runner, while the second annular chamber communicates with the radial passage of the output shaft and with a control valve. A second spacer is mounted axially spaced from the first spacer and forms with the first annular spacer the second annular chamber. The second annular chamber and the radial and axial passages of the output shaft provide communication between the control valve and a clutch chamber of a direct drive clutch.

8 Claims, 2 Drawing Figures

PASSAGE STRUCTURE OF LOCK-UP TORQUE CONVERTER

BACKGROUND OF THE INVENTION

The present invention relates to a torque converter, and has particular reference to a lock-up torque converter, a torque converter employing a direct drive clutch.

Motor vehicles installed with an automatic transmission including a torque converter give an easy drivability but are poor in fuel economy because there is a slip within the torque converter between a pump impeller thereof and a turbine runner thereof. Therefore, there have been proposed lock-up torque converters in which during a certain operation mode such as high speed engine operation where engine cyclic torque variation is small and negligible, the turbine runner will be coupled directly with the pump impeller to prevent the occurrence of slip in the torque converter thereby to improve fuel economy.

The lock-up torque converters require, for the purpose of operating the clutch, a passage providing communication between a clutch chamber and a lock-up control valve mounted within an oil pump cover radially extending from a stationary sleeve.

According to a conventional lock-up torque converter disclosed in U.S. Pat. No. 2,793,726, an output shaft is formed with an axial passage and with a radial passage extending from the axial passage to the bottom of a circumferential groove formed around the output shaft. A bushing is mounted within an annular space between the output shaft and a stationary sleeve with an axial end thereof abutting a shoulder of the output shaft. The bushing, fixed to the stationary sleeve, surrounds the circumferential groove and is formed with a cutout which mates with the circumferential groove and with a passage formed in a pump cover communicating with a lock-up control valve. The stationary sleeve is formed at an inner surface thereof with an axial groove or recess. This axial groove runs above that portion of the bushing which is not formed with the cutout. Communication between the control valve and a clutch chamber is established through the passage within the pump cover, the cutout of the bushing, the circumferential groove of the output shaft, the radial passage opening at the bottom of the circumferential groove, the axial passage of the output shaft and a second radial passage formed in the output shaft and opening to the clutch chamber. A pump driving sleeve surrounds a portion of the stationary sleeve shaft and forms therewith a torque converter oil feed passage communicating with the inside of a pump impeller. Oil is fed to the pump impeller through the feed passage and discharged from a turbine runner through the annular space and the axial groove formed in the stationary sleeve.

In this known passage structure, the circumferential groove formed in the output shaft and the bushing with the cutout are necessary for providing communication between the radial passage opening to the axial passage formed within the output shaft and the passage formed in the pump cover communicating with the control valve.

A problem with this known lock-up torque converter is derived from the provision of the output shaft with the circumferential groove. The problem resides in that, in designing an output shaft, the diameter of the output shaft must be sufficiently large enough to compensate for the structural weakness caused by the formation of a circumferential groove around the output shaft. Thus, it is necessary to use an output shaft large enough to compensate for the structural weakness caused by the circumferential groove.

SUMMARY OF THE INVENTION

An object of the present invention is to provide a lock-up torque converter employing a simple passage structure which permits the use of an output shaft having no structural weakness.

According to the invention, an annular space between an output shaft and a stationary sleeve is divided by a first spacer into a first annular chamber communicating with the inside of a turbine runner and into a second annular chamber and a second spacer is mounted axially spaced from the first spacer and forms with the latter the second annular chamber. The output shaft is formed with an axial passage and with a radial passage communicating with the axial passage. This radial passage is open to the second annular chamber which in turn communicates with a lock-up control valve.

One advantage of the lock-up torque converter according to the present invention over that according to the prior art mentioned above resides in that, in designing an output shaft, the diameter of the output shaft can be reduced according to the invention as compared to the diameter of an output shaft for the prior art which must be large enough to compensate for the structural weakness caused by the provision of a circumferential groove.

Another object of the present invention is therefore to reduce the diameter of an output shaft of a lock-up torque converter so as to reduce the radial dimension of the torque converter.

BRIEF DESCRIPTION OF THE DRAWINGS

Other advantages and features of the present invention will become clear as the discussion proceeds as to the preferred embodiment of a lock-up torque converter in connection with the accompanying drawings.

In the accompanying drawings.

DESCRIPTION OF THE PREFERRED EMBODIMENT

Figure 1:
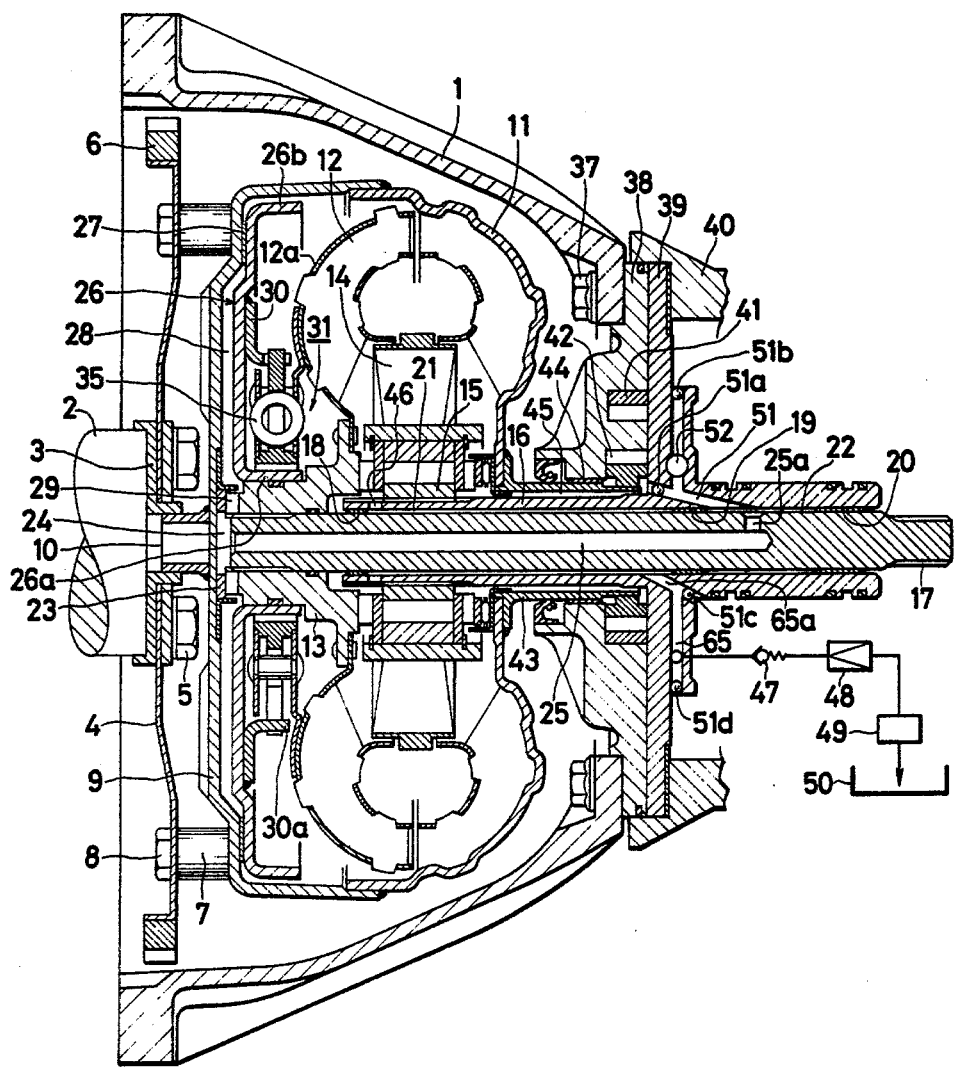
FIG. 1 is a longitudinal sectional view of the preferred embodiment of a lock-up torque converter according to the present invention together with a diagram showing an oil circuit leading from the torque converter to an oil reservoir.

Referring to FIG. 1, the reference numeral 1 designates a converter housing and the reference numeral 2 a crankshaft. A boss 3 and a drive plate 4 are concentrically secured to the end of the crankshaft 2, such as, by means of a plurality of fasteners 5. Drive plate 4 carries at its outer periphery a ring gear 6. Drive plate 4 is drivably connected to a converter cover 9 concentrically by means of a plurality of fasteners 8 using the corresponding number of spacers 7. A sleeve 10 is secured to the central portion of the converter cover 9. The sleeve 10 is received in the boss member 3 and thus the converter cover 9 is centered with respect to the crankshaft 2. Converter cover 9 has a cylindrical shape having a closed end wall adjacent the drive plate 4 and an open end. To the outer periphery of the converter cover 9 adjacent the axial end defining the open end thereof, pump impeller 11 is secured by welding so as to be coupled with the converter cover 9. A turbine runner 12 is secured to a hub 13 at a flange thereof by rivetting. A stator 14 is situated between the pump impeller 11 and the turbine runner 12 to form a torque converter. Stator 14 is mounted to a hollow stationary sleeve 16 through a one-way clutch 15.

The stationary sleeve 16 permits an output shaft 17, which may be a transmission input shaft, to extend therethrough with an annular space or play between them. Between the stationary sleeve 16 and the output shaft 17 three spacers (bushings) 18, 19 and 20 are disposed axially spaced one after another to divide the annular space into two annular chambers 21 and 22. The hub 13 for the turbine runner 12 is splined to the output shaft 17. Between the closed end wall of the converter cover 9 and its adjacent axial end of the hub 13, an annular member or spacer 23 is disposed to define an end chamber 24. This end chamber 24 communicates with the annular chamber 22 through an axial passage 25 formed in the output shaft 17 and through a radial passage 25a formed therein.

A generally annular clutch piston 26 is slidably mounted on the hub 13 on an annular portion thereof. An annular clutch facing 27 is attached to the adjacent surface of the clutch piston 26 to the converter cover 9. When the clutch facing 27 of the clutch piston 26 engages with the adjacent surface of the end wall of the converter cover 9 upon engagement of the clutch, a clutch chamber 28 is formed between the converter cover 9 and the clutch piston 26. The clutch chamber 28 communicates with the annular chamber 24 through radial grooves or passages 29 formed at one axial end of the hub 13. Secured to the remote end wall of the clutch piston 26 is an annular mounting member 30. Within a limited space available between the inner periphery of the turbine runner 12 and the inner periphery of the clutch piston 26 a damper 31 including springs 35 is operatively connected between the clutch piston 26 and the hub 13 to provide a driving connection.

The construction of the clutch piston 26 and that of the annular mounting member 30 will be described hereinafter. The clutch piston 26 is die formed from a piece of sheet metal and includes an inner axially extending flange 26a and an outer axially extending, in the same direction, flange 26b. The clutch piston 26 is slidably mounted by the inner axially extending flange 26a on the hub 13. The outer axially extending flange 26b is formed for reinforcement purpose of the annular portion of the clutch piston 26 which will be subjected to difference, in pressure, upon engagement of the lock-up clutch. The annular mounting member 30 has a plurality of inner axially extending circumferentially spaced mounting legs 30a.

The remote open end of the converter housing 1 from the crankshaft 2 is secured to a pump housing 38 which in turn is secured to a pump cover 39 secured to a transmission case 40 by means of fasteners 37. The pump cover 39 extends radially from the stationary sleeve 16. Within the pump housing 38, oil pump elements including an outer gear 41 and an inner gear 42 are operatively disposed. A pump driving sleeve 43 extends into the pump housing 38 and journalled thereby by means of a bushing 44. The pump driving sleeve 43 permits the stationary sleeve 16 to extend therethrough, and has one axial end drivingly connected to the pump impeller 11 and has an opposite end splined to the inner gear pump element 42. The pump driving sleeve 43 is spaced from and surrounds a portion of the stationary sleeve 16 to form with the latter an oil feed passage 45. The oil feed passage 45 communicates with the inside of the pump impeller 11 of the torque converter assembly.

Radial passages 46 formed through the stationary sleeve 16 provide communication between the inside of the turbine runner 12 and the annular chamber 21. The annular chamber 21 communicates with an inclined passage 65a formed in the pump cover 39 which in turn communicates with a passage 65 formed therein. This passage 65 communicates with a pressure maintaining valve 47. With the pressure maintaining valve 47, the pressure within the torque converter assembly is maintained at a predetermined level. The pressure maintaining valve 47 communicates with an oil cooler 48 communicating in turn with various parts 49 which require lubrication and with an oil reservoir 50.

The annular chamber 22 communicates with an inclined passage 51 (where the reference numerals 51a and 51b designate fit-in balls) formed in the pump cover 39 which in turn communicates with a lock-up control valve 52 mounted within the pump cover 39. The control valve 52 has the function to selectively pressurize or exhaust the passage 51.

Figure 2:
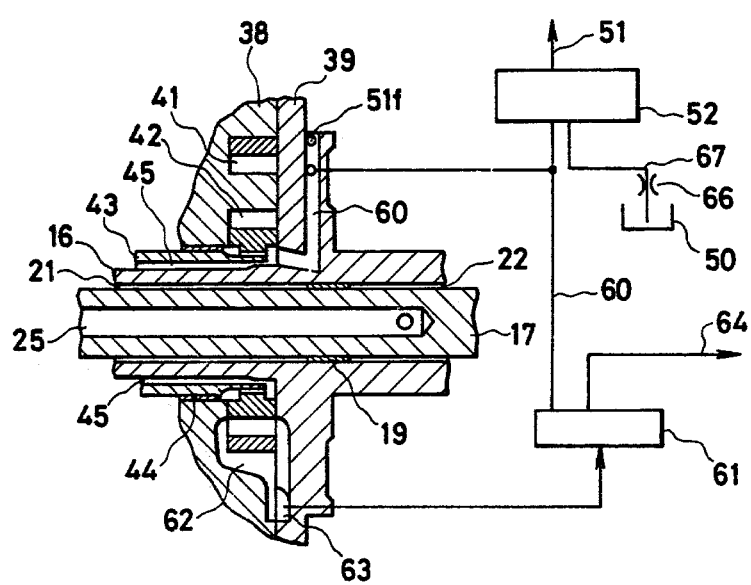
FIG. 2 is a circuit diagram explaining the operation of a lock-up control valve.

Referring to FIG. 2, a discharge passage 63 provides communication between the discharge side 62 of the pump and a pressure regulator valve 61 which provides a so-called line pressure at a passage 64 which selectively communicates with various servos of a hydraulic control system for a transmission mechanism to which an input power is fed by the output shaft 17. The oil displaced upon regulating function within the pressure regulator valve 61 is discharged into a passage 60. This passage 60 communicates with the passage 45 which communicates with the inside of the pump impeller 11.

Although only diagrammatically shown in FIG. 2, the control valve 52 is responsive to a pressure signal representing a predetermined condition in which a lock-up of the torque converter is desirable to take a first position in which the passage 51 (see FIG. 1 also) is connected to a drain passage 67 provided with a flow restrictor 66 so that the passage 51 is exhausted. Under the other conditions, the control valve 52 takes a second position in which the passage 51 is connected to the passage 60 so that the passage 51 is pressurized.

It will now be understood from the preceeding description and the inspection of FIGS. 1 and 2 that pressurized oil will flow into the pump impeller 11 through the passage 60 (see FIG. 2) formed in the pump cover 39 and the passage 45 between the stationary sleeve 16 and the pump driving sleeve 43, and the oil will flow out of the turbine runner 12 toward the oil cooler 48 through the radial passages 46 formed in the stationary sleeve 16, the annular chamber 21, the inclined passage 65a, the radial passage 65 and the pressure maintaining valve 47.

It will also be understood that the control valve 52 communicates with the clutch chamber 28 through the inclined passage 51, the annular chamber 22, the radial passage 25a, the axial passage 25, the end chamber 24 and the radial passages 29.

The operation of the torque converter according to the invention will be understood from the following description.

The rotation of the crankshaft 2 is always delivered to the pump impeller 11 through the drive plate 4, the fasteners 8 and the converter cover 9. The rotation of the pump impeller 11 is delivered through the pump driving sleeve 43 to the pump element inner gear 42. Thus the oil pump operates as long as the engine operates.

When the vehicle operating condition does not satisfy a predetermined condition in which lock-up clutch engagement is required, the control valve 52 permits the passage 51 to be pressurized. Meanwhile, oil is supplied to the inside of the pump impeller 11. The oil in the inside of the torque converter assembly flows out of the turbine runner 12. The oil discharged from the turbine runner 12 flows toward the pressure maintaining valve 47, thus the pressure within the torque converter assembly being maintained at a certain level determined by the pressure maintaining valve 47. This pressure, i.e., the pressure within the torque converter assembly, is transmitted through the lock-up control valve 52, the passages 51 and 25, the chamber 24 and radial passage 29 to the clutch chamber 28. Thus, the clutch piston 26 is held disengaged from the converter cover 9 when the clutch chamber 28 is pressurized.

Under this condition, the torque converter will perform its torque multiplying function because the oil maintained at the certain pressure will transmit the torque under the reaction of the stator 14 from the pump impeller 11 to the turbine runner 12.

The oil after flowing through the pressure maintaining valve 47 will flow to the oil cooler 48 installed within the lower tank of the radiator. After being cooled by the oil cooler 48, the oil will be distributed to the various parts or portions to be lubricated in the transmission and thereafter flow back to the oil reservoir 50, i.e., the oil pan of the transmission. The oil pump including the gears 41 and 42 will draw oil from this oil reservoir 50.

When the vehicle operating condition satisfies the predetermined condition, for example, when the vehicle operates at speeds above a predetermined speed in the highest gear, the control valve 52 will permit the passage 51 to be exhausted. This will cause the oil within the clutch chamber 28 to be exhausted through the radial passages 29, the end chamber 24, the oil passage 25, the oil passage 51 and through the control valve 52 so that the clutch piston 26 will be urged toward the left (viewing FIG. 1) to engage with the converter cover 9 under the influence of the difference in pressure created between the both sides of the clutch piston 26. When the clutch facing 27 attached to the clutch piston 26 firmly engages with the converter cover 9, the piston 26 will be directly connected to the converter cover 9 which in turn is connected to the crankshaft 2 and the pump impeller 11 to rotate with them as a unit. The rotation of the clutch piston 26 is transmitted to the turbine runner 12 mechanically through the annular mounting member 30 and the damper 31. The impact upon initiation of the transmission of the rotational torque will be absorbed by the springs 35. Thus, the damper 31 will transmit the torque while suppressing the impact which otherwise would take place upon change in magnitude of the torque transmitted therethrough. In this manner, the turbine runner 12 is directly connected to the crankshaft 2 and the pump impeller 11 through the damper 31, the clutch piston 26 and the converter cover 9.

It will be understood that the connection between a passage within a pump cover and a radial passage within an output shaft communicating with an axial passage within the output shaft has been simplified by using an annular chamber between two bushings, which rotatably support the output shaft.

It will also be understood that the use of inclined passages have simplified connection between a lock-up control valve 52 mounted within a pump cover and one of two annular chambers and connection between a passage, for draining purpose, formed within the pump cover and the other annular chamber.

What is claimed is:

1. In a lock-up torque converter
an input member;
a converter cover driven by said input member;
a pump impeller secured to said converter cover and forming therewith a chamber;
an output shaft;
a turbine runner within said chamber connected to said output shaft;
a clutch piston mounted within said chamber;
a stationary sleeve rotatably receiving said output shaft and forming therewith an annular space;
a pump;
a pump cover for said pump radially extending from said stationary sleeve;
a pump driving sleeve secured to said pump impeller and operatively connected to said pump to drive the latter, said pump drive sleeve surrounding a portion of said stationary sleeve and forming therewith a passage communicating with the inside of said pump impeller;
a control valve;
said output shaft having an axial passage and a radial passage communicating with said axial passage;
a spacer mounted within said annular space to divide the latter into a first annular chamber communicating with the inside of said turbine runner and into a second annular chamber communicating with said radial passage of said output shaft and with said control valve.

2. A lock-up torque converter as claimed in claim 1, including
a second spacer mounted axially spaced from said first spacer within said annular space and forming with said first spacer said second annular chamber within said annular space.

3. A lock-up torque converter as claimed in claim 2, including
a third spacer mounted axially spaced from said first spacer within said annular space and forming with said first spacer said first annular chamber within said annular space;
in which
said stationary sleeve has a second radial passage establishing communication between said first annular chamber and the inside of said turbine runner.

4. A lock-up torque converter as claimed in claim 2 or 3, in which
said pump cover has a first inclined passage communicating with said first annular chamber and a second inclined passage communicating with said second annular chamber.

5. A lock-up torque converter as claimed in claim 4, in which
said control valve is mounted within said pump cover.

6. A lock-up torque converter as claimed in claim 3, in which
each of said spacers is in the form of a bushing.

7. A lock-up torque converter as claimed in claim 2 or 3, including
a hub nonrotatably receiving said output shaft and secured to said turbine runner;
in which
said clutch piston is axially slidably mounted on said hub;
in which
said converter cover, said hub and said output shaft cooperate with each other to form an end chamber communicating with said axial passage of said output shaft;
in which
said clutch piston is engageable with said converter cover to form therewith a clutch chamber upon engagement thereof with the latter; and
in which
said hub has radial passages establishing communication between said clutch chamber and said end chamber.

8. A lock-up torque converter as claimed in claim 6, in which
said stationary sleeve rotatably supports said output shaft with said first, second and third bushings.

* * * * *